United States Patent [19]
McCloskey

[11] 3,825,983
[45] July 30, 1974

[54] METHOD FOR MANUFACTURING SPHERICAL BEARING ASSEMBLIES

[75] Inventor: Albert R. McCloskey, Fairfield, Conn.

[73] Assignee: Rockwell International Corporation, Pittsburgh, Pa.

[22] Filed: Feb. 12, 1973

[21] Appl. No.: 331,500

[52] U.S. Cl. .......................................... 29/149.5 B
[51] Int. Cl. ...................... B23p 11/00, B21d 53/10
[58] Field of Search . 29/149.5 B, 149.5 R, 148.4 A, 29/148.4 R, 523, 511

[56] References Cited
UNITED STATES PATENTS

| 2,804,679 | 9/1957 | Tracy | 29/149.5 B |
| 2,898,671 | 8/1959 | Heim | 29/149.5 B |
| 2,904,874 | 9/1959 | Norton | 29/149.5 B |
| 3,191,205 | 6/1965 | McCloskey | 29/149.5 B |
| 3,221,391 | 12/1965 | Heim | 29/149.5 B |

Primary Examiner—Thomas H. Eager

[57] ABSTRACT

Method of manufacturing a spherical bearing assembly comprising the steps of expanding an outer race member into mechanical interlocking engagement with a machine element or apparatus, inserting a spherical ball within the so mechanically interlocked outer race member, deforming by use of the die means a portion of spherical outer race member around said ball to form an integral spherical bearing assembly.

1 Claim, 6 Drawing Figures

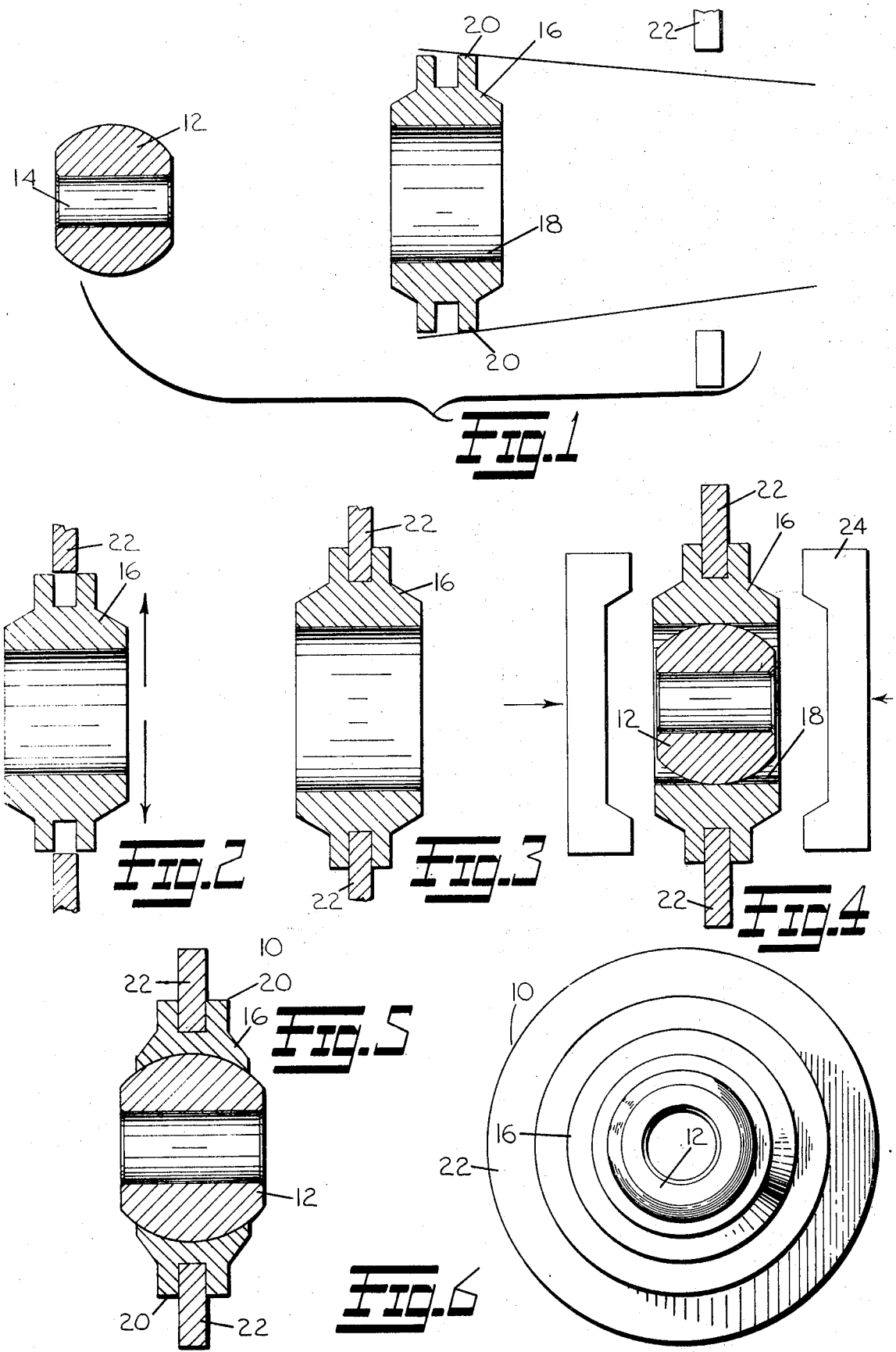

METHOD FOR MANUFACTURING SPHERICAL BEARING ASSEMBLIES

BACKGROUND OF THE INVENTION

This invention relates generally to a novel method for manufacturing spherical bearings.

Spherical bearings or ball and socket type ball bearings are in a broad sense an extremely old art. One only has to look back to the first forms of animal life in which bones and joints were present. Typically, the specifications for spherical bearing assemblies are most exacting as to shape, dimension and overall strength. Spherical bearings present unique problems of achieving uniform bearing contact between the convex outer surface of the ball and the concave inner surface of the outer race member of the socket. This requirement of uniform bearing contact therefore requires a high order and type of dimensional control over the various elements comprising the spherical bearing assembly as well as the method and apparatus by which the bearing assembly is manufactured.

Spherical bearing assemblies continue to gain wider and wider acceptance in industry and accordingly there are continual efforts to improve upon the quality of the spherical bearing product while at the same time to simplify the method of manufacturing these spherical bearings. Typically, the method of manufacturing these types of bearings have included numerous, complicated and costly steps regarding sophisticated, expensive and difficult to maintain apparatus.

SUMMARY OF THE INVENTION

It is therefore an object of the present invention to provide a versatile, rapid, inexpensive, and easy to control method of manufacturing a spherical bearing assembly.

Another objective of the present invention is to provide a simple and unique method of manufacturing a spherical bearing assembly.

It is still another objective of the present invention to provide a method of manufacturing a spherical bearing assembly comprising the steps of expanding an outer race member into mechanical interlocking engagement with a machine element or apparatus, inserting a spherical ball within the so mechanically interlocked outer race member, deforming by use of the die means a portion of spherical outer race member around said ball to form an integral spherical bearing assembly.

It is yet another objective of the present invention to provide a method for manufacturing spherical bearing assemblies which readily adapt to high volume technique and apparatus and are inexpensive to practice.

It is still another important objective of the present invention to provide a method for manufacturing spherical bearing assemblies which obviates the need for inserts or the like for maintaining the spherical ball in its operational position.

Still another objective of the present invention is to provide a method of manufacturing a spherical bearing assembly in accordance with the present invention which obviates the need for staking or placing a spherical bearing assembly within a machine element or apparatus.

With the foregoing objectives in mind I have devised a novel method of manufacturing a spherical bearing assembly as illustrated in the accompanying drawings forming part of the specification. It is, however, to be understood that the present invention is not limited to the specific details shown or described, but may embody various changes and modifications within the scope of the invention.

DESCRIPTION OF THE DRAWINGS

FIG. 1 is a sectional view of a spherical bearing assembly in its unassembled state.

FIG. 2 shows the first step of mounting a tubular-like outer race member within a machine element or apparatus.

FIG. 3 shows another step of the method of manufacturing a spherical bearing assembly in accordance with the present invention in which the tubular-like outer race member has been expanded to be mechanically interlocked with the machine element or apparatus.

FIG. 4 shows yet another step of the method of manufacturing a spherical bearing assembly in accordance with the present invention in which the spherical ball is placed within the tubular outer race member, centrally disposed therein, tapered dies will then deform a portion of the outer race member about the spherical ball.

FIG. 5 is a sectional view of a completed spherical bearing assembly manufactured in accordance with the present invention.

FIG. 6 is a side view of a spherical bearing assembly manufactured in accordance with the present invention.

DETAILED DESCRIPTION OF THE DRAWINGS

Referring now to the drawings and in particular FIGS. 1 through 6 there is shown the various steps comprising the unique method of manufacturing spherical bearing assemblies in accordance with the present invention as well as a completed bearing assembly 10. Referring now particularly to FIG. 1 there is shown an unassembled spherical bearing assembly comprising a spherical ball 12 having a convex outer surface and a hole 14 central thereto. The spherical bearing assembly also comprises a tubular-like outer race member 16 having a central cylindrical bore 18 and annular lips 20 exterior thereto. Finally, the spherical bearing assembly comprises a machine element or apparatus 22 to which the ball 12 and the outer race tubular-like member 16 is to be assembled.

Referring now to FIGS. 2 through 4 there is shown the unique and simplistic steps of manufacturing a spherical bearing assembly in accordance with the present invention. Step 1 of this unique method comprises placing the tubular-like outer race member 16 within the machine element or apparatus 22. It is to be noted that the outer diameter of the tubular-like member 16 as defined by the outer frame portions of the annular lips 20 is less than the diameter of the opening of the machine element or apparatus. This enables the placing of the tubular-like member 16 within the said machine element or apparatus 22.

By the use of a tapered punch or other like expanding member (not shown) the outer race member 16 can be expanded into mechanical interlocking relationship with the machine element 22. The so mechanically interlocked tubular-like outer race member is shown in FIG. 3. It is to be noted that at this particular stage of the unique method the inner surface of the outer race member may be cylindrical in shape. It is to be understood that a variation of this method could include the preforming of one end of the outer race member such that it would be hemispherical in shape, that is, half of the concave bearing surface of the outer race member could be preformed.

Referring now to FIG. 4 there is shown the tubular-like outer race member 16 mechanically interlocked with the machine element of apparatus 22 and spherical ball 12 placed within the bore of the outer race member 16. Preferably the ball should be placed by a suitable jig or fixture in a central position within a tubular-like bore 18 of the outer race member 16. Dies 24 driven by suitable die power apparatus (not shown) are moved axially with respect to the bore 18 of the outer race member to deform a portion of the outer race member 16 about the spherical ball 12 to complete the spherical bearing assembly. FIGS. 5 and 6 show such a completed spherical bearing assembly manufactured in accordance with a method of manufacturing as set forth above.

It is to be recognized that the outer race member 16 could be provided with two annular lips and the machine element could be provided with a single annular lip (all not shown). The annular lips on the machine element could be accordingly mechanically interlocked with the single annular lip on the outer race member.

It is to also be recognized that the described method of manufacturing of spherical bearing assemblies is unique and simplistic when considered in the context of the prior art. One having ordinary skill in this art could immediately discern that the above described method is highly adaptable to high volume manufacturing technology. Additionally, it could be seen that the completed spherical bearing assembly results in a particularly strong bearing which is mated to a machine element or apparatus and that this unique method obviates both the need for inserts or for staking a spherical bearing assembly within such an element or apparatus.

Another immediate advantage of the above described method is that it results in a bearing assembly which can be removed from the machine element or apparatus by simply removing one of the annular lips 20 such as by machining or the like. With a staked bearing, that is, a bearing directly staked to a machine element, removal of the bearing assembly may require actual cutting of the machine element to which bearing assembly is attached.

It should also be noted that the method as above described in this specification is uniquely adapted to be utilized in attaching or mating a spherical bearing assembly within an internally flanged machine element or the like.

Many suitable materials can be used for the various parts of the spherical bearing assembly and in particular the outer race member 16 could be of heat treatable low carbon alloys and stainless steel as well as aluminum and copper alloys depending upon the particular application of the bearing in question. Other specialty materials also could be used as appropriate. Additionally, the concave inner surface of the outer race member 16 and/or the convex outer surface of the spherical ball could be treated with suitable self lubricating materials such as teflon (polytetrafluoroethylene).

I claim:

1. Method of manufacturing a spherical bearing assembly comprising the steps of expanding an outer race member into mechanical interlocking engagement with a machine element or apparatus, inserting a spherical ball centrally within the so mechanically interlocked outer race member, deforming by use of the die means a portion of said outer race member around said ball to form an integral spherical bearing assembly, said outer race member is provided with a central cylindrical bore in which said spherical ball is centrally inserted therein, said outer race member is provided with at least two annular lips spaced equidistant from the end of said outer race member adapted to be brought into mechanical, interlocking engagement with machine element or apparatus, said die means are dies adapted to uniformly deform selected portions of the outer race member around said ball, said inner surface of said outer race member is concave and generally conforms to the convex outer surface of said spherical ball, whereby said spherical bearing assembly is interlocked with said machine element in a symmetrical fashion.

* * * * *